(12) United States Patent
Doyle et al.

(10) Patent No.: US 9,024,505 B2
(45) Date of Patent: May 5, 2015

(54) SWASHPLATE-MOUNTED PERMANENT MAGNET ALTERNATOR

(75) Inventors: Jordan Doyle, Fort Worth, TX (US); James Mast, Burleson, TX (US); Cristos Bias, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 294 days.

(21) Appl. No.: 13/576,575

(22) PCT Filed: Mar. 21, 2011

(86) PCT No.: PCT/US2011/029134
§ 371 (c)(1), (2), (4) Date: Aug. 1, 2012

(87) PCT Pub. No.: WO2011/119458
PCT Pub. Date: Sep. 29, 2011

(65) Prior Publication Data
US 2012/0299428 A1    Nov. 29, 2012

Related U.S. Application Data

(60) Provisional application No. 61/316,645, filed on Mar. 23, 2010.

(51) Int. Cl.
*H02K 1/22* (2006.01)
*B64C 27/605* (2006.01)
*B64D 41/00* (2006.01)

(52) U.S. Cl.
CPC .............. *B64C 27/605* (2013.01); *B64D 41/00* (2013.01); *Y02T 50/44* (2013.01)

(58) Field of Classification Search
CPC ...... H02K 23/54; H02K 21/24; H02K 1/2793
USPC .................... 310/82, 268, 266, 267
See application file for complete search history.

(56) References Cited

U.S. PATENT DOCUMENTS

| | | | |
|---|---|---|---|
| 4,066,890 A | | 1/1978 | Hamilton et al. |
| 4,188,556 A | * | 2/1980 | Hahn ........................ 310/268 |
| 5,015,187 A | | 5/1991 | Lord |
| 5,646,467 A | | 7/1997 | Floresta et al. |

(Continued)

FOREIGN PATENT DOCUMENTS

| | | |
|---|---|---|
| JP | 2003106250 A | 4/2003 |
| WO | 2005100154 | 10/2005 |
| WO | 2005100154 A1 | 10/2005 |

OTHER PUBLICATIONS

International Search Report and the Written Opinion of the International Searching Authority mailed by ISA/USA, U.S. Patent and Trademark Office on May 19, 2011 for International Patent Application No. PCT/US2011/029134, 9 pages.

(Continued)

*Primary Examiner* — Hanh Nguyen
(74) *Attorney, Agent, or Firm* — James E. Walton

(57) ABSTRACT

A swashplate system includes a rotating outer ring and a non-rotating inner ring, the rotating outer ring being adapted to carry a coil of wire and the non-rotating inner ring being adapted to carry a first and a second magnet. The first and second magnets create a magnetic field and an electrical current is created as the coil of wire passes through the magnetic field as the rotating outer ring rotates.

10 Claims, 5 Drawing Sheets

(56) References Cited

U.S. PATENT DOCUMENTS

| | | | |
|---|---|---|---|
| 6,048,172 | A | 4/2000 | Pniel |
| 7,218,025 | B1 | 5/2007 | McDonald |
| 8,026,626 | B1* | 9/2011 | Meller ............................ 290/55 |
| 8,178,992 | B1* | 5/2012 | Meller ............................ 290/55 |
| 2004/0195933 | A1* | 10/2004 | Rose ............................. 310/268 |
| 2005/0046195 | A1 | 3/2005 | Kousoulis |
| 2006/0202588 | A1* | 9/2006 | Lin ............................... 310/268 |
| 2007/0247017 | A1* | 10/2007 | Bumby ......................... 310/268 |
| 2008/0225536 | A1 | 9/2008 | Landry |
| 2009/0033099 | A1 | 2/2009 | Nilsson |

OTHER PUBLICATIONS

European Search Report dated Jun. 20, 2013 from EP counterpart App. No. 11759964.7.

Office Action from Application No. 2,972,877, issued by the Canadian Intellectual Property Office on Aug. 27, 2013.

Office Action dated Apr. 1, 2014 from counterpart CN App. No. 2011800149449.

Office Action dated Nov. 18, 2014 from counterpart CN App. No. 2011800149449.

* cited by examiner

| R (ref) | CURRENT | VOLTAGE | POWER |
|---|---|---|---|
| open | — | 38.2 | 0 |
| 250 | 0.143 | 35.2 | 5.0 |
| 125 | 0.2995 | 34.6 | 10.4 |
| 75 | 0.494 | 34 | 16.8 |
| 50 | 0.688 | 33.3 | 22.9 |
| 35 | 1.01 | 32.2 | 32.5 |
| 25 | 1.31 | 31.15 | 40.8 |
| 20 | 1.67 | 29.85 | 49.8 |
| 15 | 1.97 | 28.79 | 56.7 |
| 10 | 2.58 | 26.68 | 68.8 |
| 7.5 | 3.45 | 23.49 | 81.0 |
| 5 | 4.19 | 20.62 | 86.4 |

SWASHPLATE-MOUNTED PERMANENT MAGNET ALTERNATOR

TECHNICAL FIELD

The present application relates generally to swashplates, and more specifically, to a swashplate having an alternator.

DESCRIPTION OF THE PRIOR ART

Both swashplates and alternators are well known in the art. A swashplate is a device that translates flight control input to the rotary system. Alternators are adapted to convert mechanical energy into electrical energy, which in turn is channeled to one or more electrical subsystems.

Electrical energy is required to power one or more electrical subsystems located on the rotor and/or rotary system of a conventional rotary aircraft. The alternator is an effective means for converting mechanical energy from the aircraft engine to electrical energy for powering the aircraft electrical subsystems.

The aircraft alternator is typically positioned near the engine, which creates problems when channeling the electrical energy to one or more electrical subsystems located on rotary system due to the continuous swashplate rotation. Slip ring and/or other suitable devices are typically used when transferring the electrical energy through the rotary system.

Although the foregoing developments represent strides in the area of swashplate system, many shortcomings remain.

BRIEF DESCRIPTION OF THE DRAWINGS

The novel features believed characteristic of the application are set forth in the appended claims. However, the application itself, as well as a preferred mode of use, and further objectives and advantages thereof, will best be understood with reference to the following detailed description when read in conjunction with the accompanying drawings, wherein:

Figure 1:
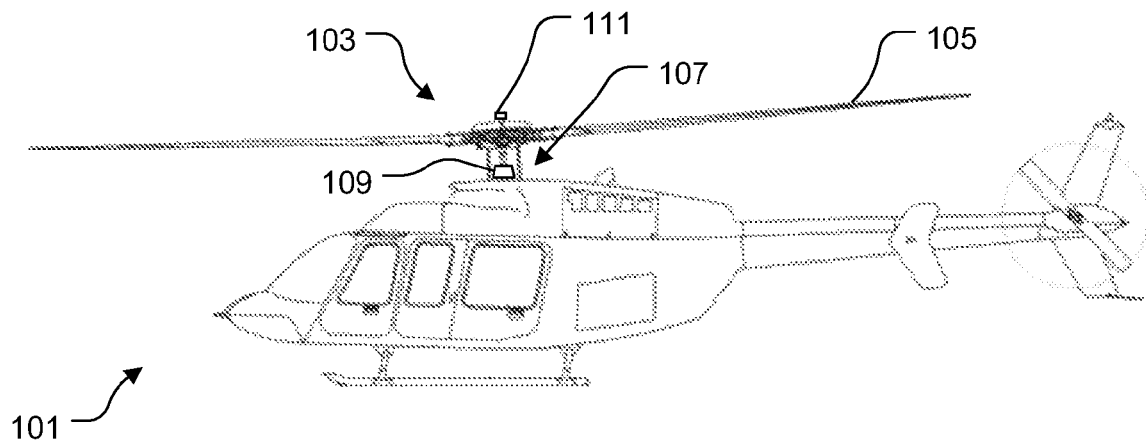
FIG. 1 is a side view of a rotary aircraft adapted with a swashplate system according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DESCRIPTION OF THE PREFERRED EMBODIMENT

The swashplate system of the present application overcomes common disadvantages associated with conventional methods and devices for transferring electrical energy from the alternator to one or more electrical subsystems positioned on a rotary system. Illustrative embodiments are described below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1 in the drawings, a side view of a rotary aircraft 101 is shown according to the preferred embodiment of the present application. Rotary aircraft 101 comprises one or more of a rotor system 103 having rotors 105 operably associated with a swashplate system 107.

It should be understood that swatchplate system 107 is adapted to provide the same maneuverability, i.e., rotation, pivoting, tilting, and/or other movements about the rotor shaft as conventional swatchplate systems commonly known in the art. In addition, it should be understood that the simplified depiction of swashplate system 107 should not be narrowly construed as having the exact geometric contouring as shown in the drawings, unless specified, but should be construed as having the necessary contouring, size, and other geometric profiling to perform the necessary operation as a conventional swatchplate. Furthermore, it should be understood that the necessary components, such as bearings, bolts, liners, and other necessary components of a swashplate system are not shown in order to quickly and easily describe the swashplate system of the present application; however, it should be understood that the swashplate system of the present invention includes all necessary components to operate as a swashplate, as conventionally known in the art, although not shown in the drawings.

In the exemplary embodiment, swashplate system 107 is used with a rotary aircraft, i.e., a helicopter; however, it should be appreciated that the swashplate system could easily be adapted for use with other types of aircraft, including fixed and tilt-wing aircraft, in lieu of the preferred embodiment. Also, swashplate system 107 is utilized with the main rotor system of the rotary aircraft; however, it should be appreciated that the swashplate system could easily be adapted for use with other rotor systems, including the tail rotor system, as well as aircraft having multiple main rotors such as a tandem rotary aircraft. It will be appreciated that swashplate system 107 eliminates dedicated wires passing through the mast; and also eliminates the need for a slip-ring, which greatly reduces added weight to aircraft 101.

Aircraft 101 is further provided with an alternator subsystem 109 adapted to convert mechanical energy from rotor system 103 to electrical energy and transfer the electric energy to one or more electrical subsystems 111 and/or other power consuming devices operably associated with rotary aircraft 101. In the preferred embodiment, alternator subsystem 109 creates and provides electrical energy to one or more electrical subsystems associated with rotor system 103; however, it should be appreciated that alternator subsystem 109 could easily be adapted to provide electrical energy to one or more electrical subsystems carried by aircraft 101. For example, alternator system 109 could be adapted to provide electrical energy to an electrical subsystem located within the aircraft fuselage.

Electrical subsystem 111 is preferably a sensor selectively positioned on one or more components of rotor system 103 for providing real time monitoring of the rotary system. The sensors enable easy and rapid diagnosis of rotor system 103, which in turn reduces aircraft downtime and associated costs due to routine maintenance inspections. However, it will be appreciated that alternative embodiments of electrical subsystem 111 could include different electrical devices in lieu of the preferred embodiment. For example, alternative embodiments could include lights, warning devices, and/or other suitable devices operably associated with rotary system 103.

Figure 2:
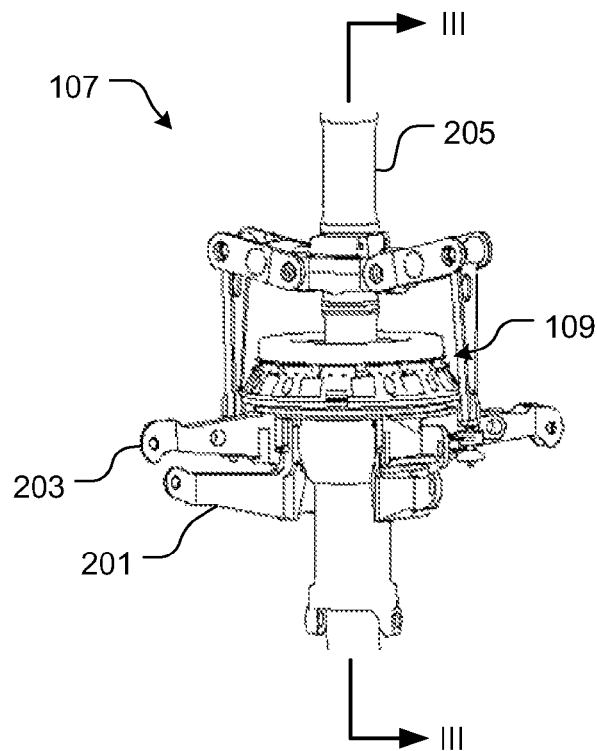
FIG. 2 is an oblique view of the swashplate system of FIG. 1.

Referring to FIG. 2 in the drawings, an oblique view of swashplate system 107 is shown according to the preferred embodiment of the present application. Swashplate system 107 comprises one or more of an inner ring 201 and an outer ring 203. It should be understood that outer ring 203 is adapted to rotate about rotary shaft 205, while inner ring 201 remains stationary about shaft 205. In the preferred embodiment, alternator subsystem 109 comprises rotating and non-rotating components carried by and coupled to outer ring 203 and inner ring 201, respectively. Further illustration and description of alternator subsystem 109 is provided below.

Figure 3:
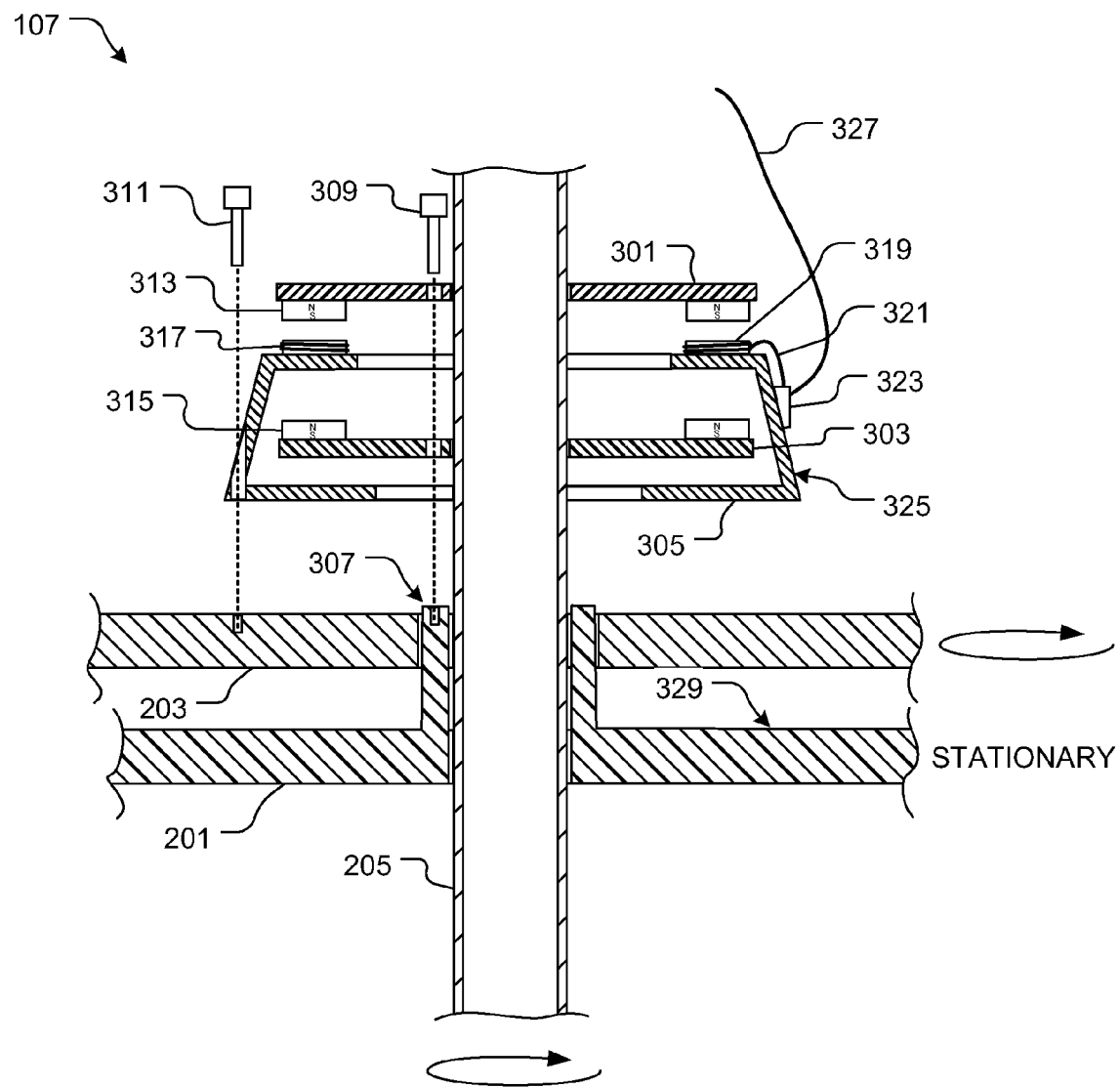
FIG. 3 is a cross-sectional side view of the swashplate system of FIG. 2 taken at III-III.

FIG. 3 shows a cross-sectional side view of the swashplate system 107 of FIG. 2 taken at III-III. Alternator subsystem 109 preferably comprises one or more of first non-rotating magnet member 301, an opposing non-rotating magnet member 303, and a rotating winding member 305 disposed therebetween. Non-rotating members 301 and 303 securely attach to a portion 307 of inner ring 201 via an attachment means 309, i.e., a bolt, while rotating member 305 securely attaches to outer ring 203 via an attachment means 311, i.e., a bolt. In the preferred embodiment, portion 307 is an upper bearing guide, which is supported by inner ring 201. It will be appreciated that alternative embodiments could include other devices or structures, either supported by or attached to inner ring 201, which are adapted to couple to non-rotating members 301 and 303.

Non-rotating member 301 is provided with one or more magnets 313; and likewise, non-rotating member 303 is provided with one or more opposing magnets 315 selectively positioned in polar opposite to magnets 313. The space between non-rotating members 301 and 303 preferably remains at a small distance to increase the efficiency of alternator subsystem 109. In the preferred embodiment, the space is about 0.050 inch; however, alternative embodiments could include different lengths depending on the desired application. In the preferred embodiment, magnets 313 and magnets 315 are arranged such that the magnet poles are in an alternating orientation, i.e. north and then south, in relation to each other. This arrangement creates a magnetic field (not shown) between the opposing magnets that extends orthogonally with respect a plane normal to longitudinal lengths of members 301 and 303. In the preferred embodiment, magnets 313 and magnet 315 are manufactured with about an inch square in length and with a thickness of about 0.5 inch; however, these lengths and thicknesses can vary depending on the desired application.

Winding member 305 is provided with one or more coils of wire 317 selectively positioned between magnets 313 and magnets 315 such that a side of coils 317 faces magnets 313 and the opposing side of coils 317 faces magnets 315. Coils 317 comprise a base 319 for holding a length of a metallic wire 321. In the preferred embodiment, winding member 305 comprises eighteen coils 317 of conductive wire 321; however, the number of coils could vary in alternative embodiments depending on the desired performance. It should be understood that an electrical current is created within coils 317 upon passing through the magnetic field. Thereafter, the electrical current is channeled to one or more electrical subsystems 111.

Winding member 305 is further provided with an optional rectifier 323 attached to a side surface 325 and conductively coupled to wire 321 and a wire 327. It should be understood that in some embodiments rectifier 323 is not required. Wire 327 is conductively coupled to electrical subsystem 111, thereby providing channeling means for transferring electrical energy alternator system 109 to electrical subsystem 111. Winding member 305 preferably rotates at approximately 400 RPM; however, it will be appreciated that rotor systems generally have unique RPM speeds, thus creating different electrical voltage output to electrical subsystem 111.

Depending on the method of construction of alternator subsystem 109, a single phase or n-phase winding arrangement with n+1 magnets can be employed. Use of an n-phase magnet and coil arrangements, typically n is in multiples of three, produces an alternating current that can then be rectified to provide the necessary power for the electrical subsystems mounted on the rotary system. Swashplate system 107 is preferably configured as a 3-phase system, but may also be configured in a variety of phases depending on the arrangement of magnets, coils, and related circuitry.

Alternator subsystem 109 allows for electrical energy to be produced using an existing rotating and non-rotating interface. Alternator subsystem 109 creates sufficient electrical power for powering one or more electrical subsystems 111. It will be appreciated that electrical subsystems 111 could be adapted with associated electrical devices that enables wireless communication with other electrical subsystems either carried by or detached from rotary aircraft 101. For example, an electrical subsystem could include a transmitter for relaying real time data to receiver carried by the aircraft fuselage, which transmits real time data of the aircraft performance to the pilot. It should also be appreciated that if alternator subsystem 109 is properly constructed and assembled, the lack of direct contact between the non-rotating members and rotating member enables alternator system 109 to have an unlimited service life.

In the preferred embodiment, alternator subsystem 109 includes coils sandwiched between a first and second set of magnets; however, it should be appreciated that alternator subsystem 109 could include additional coils and magnets to modify the electrical output of alternator subsystem 109. For example, an alternative embodiment could include a magnet, coil, magnet, magnet, coil, and magnet sandwiched configuration or a magnet, coil, magnet, coil, and magnet sandwiched configuration.

During operation, the aircraft engine (not shown) rotates a rotor shaft 205, which in turn rotates rotors 105. One or more driver links operably associated with rotors 105 rotate outer ring 203, which in turn rotates winding member 305. An electrical voltage is created as coils 317 of winding member 305 pass through the magnetic field created by magnets 313 and 315 of non-rotating members 301 and 303, respectively. Thereafter, the electrical voltage is channeled through wire 321 to rectifier 323. Rectifier 323 conditions and rectifies the electrical voltage, which in turn is channeled to electrical subsystem 111 via wire 327.

Figures 4, 5:
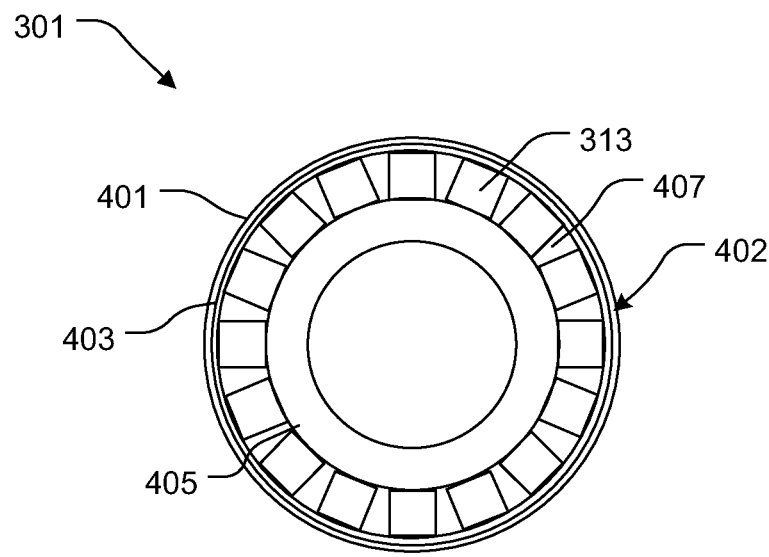
FIG. 4 is a top view of a non-rotating magnet member of an alternator subsystem of the swashplate system of FIG. 2.
FIG. 5 is a table of data compiled from testing of the swashplate system of FIG. 2.

Referring now to FIG. 4 in the drawings, a top view of non-rotating magnet member 301 is shown. Member 301 comprises one or more of base 401, outer ring 403 protruding from base 401, and an inner structure 405 protruding from base 401; all components being associated for supporting and securing magnets 313 in a fixed position. In the preferred embodiment, the planar surface 402 of base 401 is positioned relatively parallel to a top surface 329 of non-rotating inner ring 201.

To increase the effectiveness of the magnets, member 301 is further provided with a metallic plate 407 attached to base 401 and situated between a surface of base 401 and a surface of magnets 313. In the preferred embodiment, plate 407 is composed of an iron alloy material; however, alternative embodiments could include different suitable materials in lieu of the preferred embodiment. The preferred embodiment also includes 16 magnets 313; however, alternative embodiments could include more or less magnets depending on the preferred electrical outcome of alternator subsystem 109 and preferred phase. It should be appreciated that non-rotating magnet member 303 is substantially similar in form and function to member 301 and preferably include the same features as member 301.

Swashplate system 107 has been successfully tested and FIG. 5 shows a table 501 comprising data taken during the testing. In the preferred embodiment, alternator system 109 creates approximately 26.68 volts at 68.8 watts (10 ohm load) at 100% rotor RPM. It should be appreciated that swashplate system 107 could easily be modified to produce a different electrical outcome by changing alternator subsystem 109, for example, providing more or less magnets, coils, and/or adding additional circuitry such as transformers.

Figure 6:
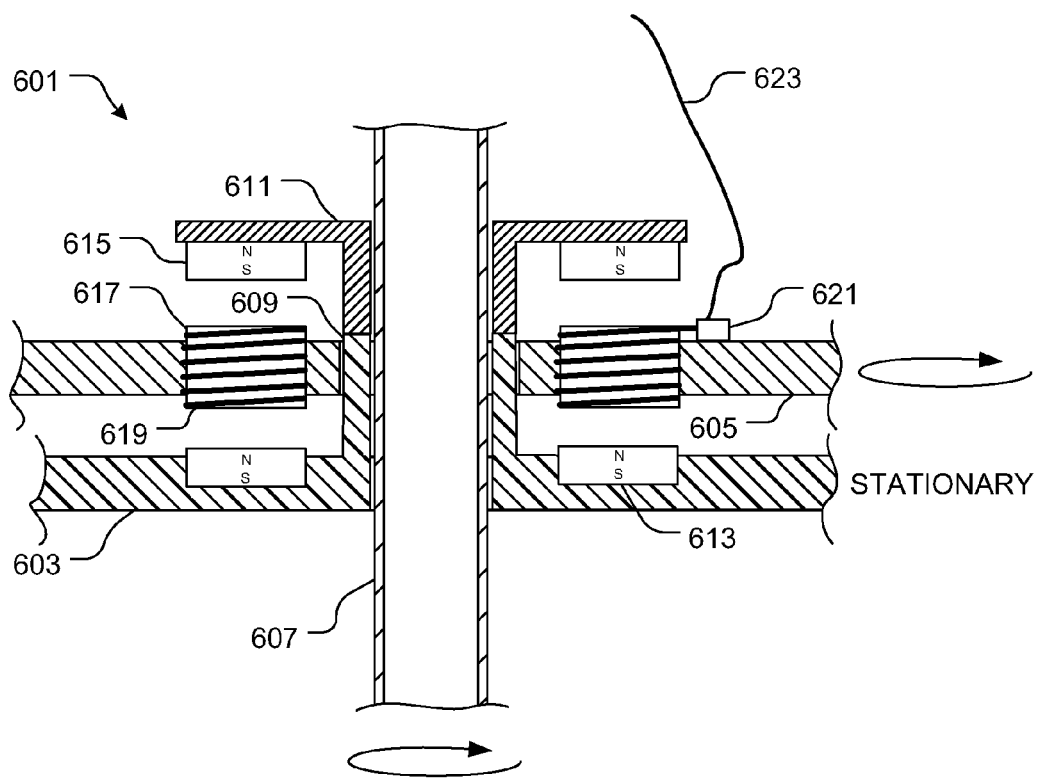
FIG. 6 is an alternative embodiment of the swashplate system of FIG. 3.

Referring to FIG. 6 in the drawings, an alternative embodiment of swashplate system 107 is shown. Swashplate system 601 is substantially similar in function to swashplate system 107. It should be understood that the features of swashplate system 107 could easily be incorporated in swashplate system 601; and likewise, the features of swashplate system 601 could interchangeable be incorporated in swashplate system 107.

Swashplate system 601 comprises one or more of an inner ring 603 and an outer ring 605. It should be understood that outer ring 605 is adapted to rotate about rotary shaft 607, while inner ring 603 remains stationary about shaft 607. In the exemplary embodiment, the coils and magnets are carried by the rings in lieu of positioning an alternator subsystem thereabove, as shown in the foregoing figures and described above in detail with reference to the preferred embodiment.

Inner ring 603 includes a portion 609 substantially similar to form and function to portion 307 of swashplate system 107. Portion 609 rigidly attaches to a support structure 611, thus holding support structure 611 in a relatively fixed position. Inner ring 603 is further provided with one or more magnets 613, either partially or fully disposed therein; and likewise, structure 611 is provided with one or more magnets 615 also either partially or fully disposed therein. Like swashplate system 107, the magnets of swashplate 601 are oriented and positioned to create a magnetic field for a coil to pass therethrough. Outer ring 605 comprises one or more coils 617 preferably extending through the thickness of outer ring 605. It should be understood that coils 617 are substantially similar in function to coils 317.

During operation, the aircraft engine (not shown) rotates a rotor shaft 607, which in turn rotates the rotors. One or more driver links operably associated with the rotors rotate outer ring 605, which in turn rotates coils 617. An electrical voltage is created as coils 617 rotate within the magnetic field. Thereafter, the electrical voltage is channeled through wire 619 to an optional rectifier 621. Rectifier 621 conditions and rectifies the electrical voltage created by the magnets and coil, which in turn is channeled to electrical subsystem 111 via wire 623.

Figure 7:
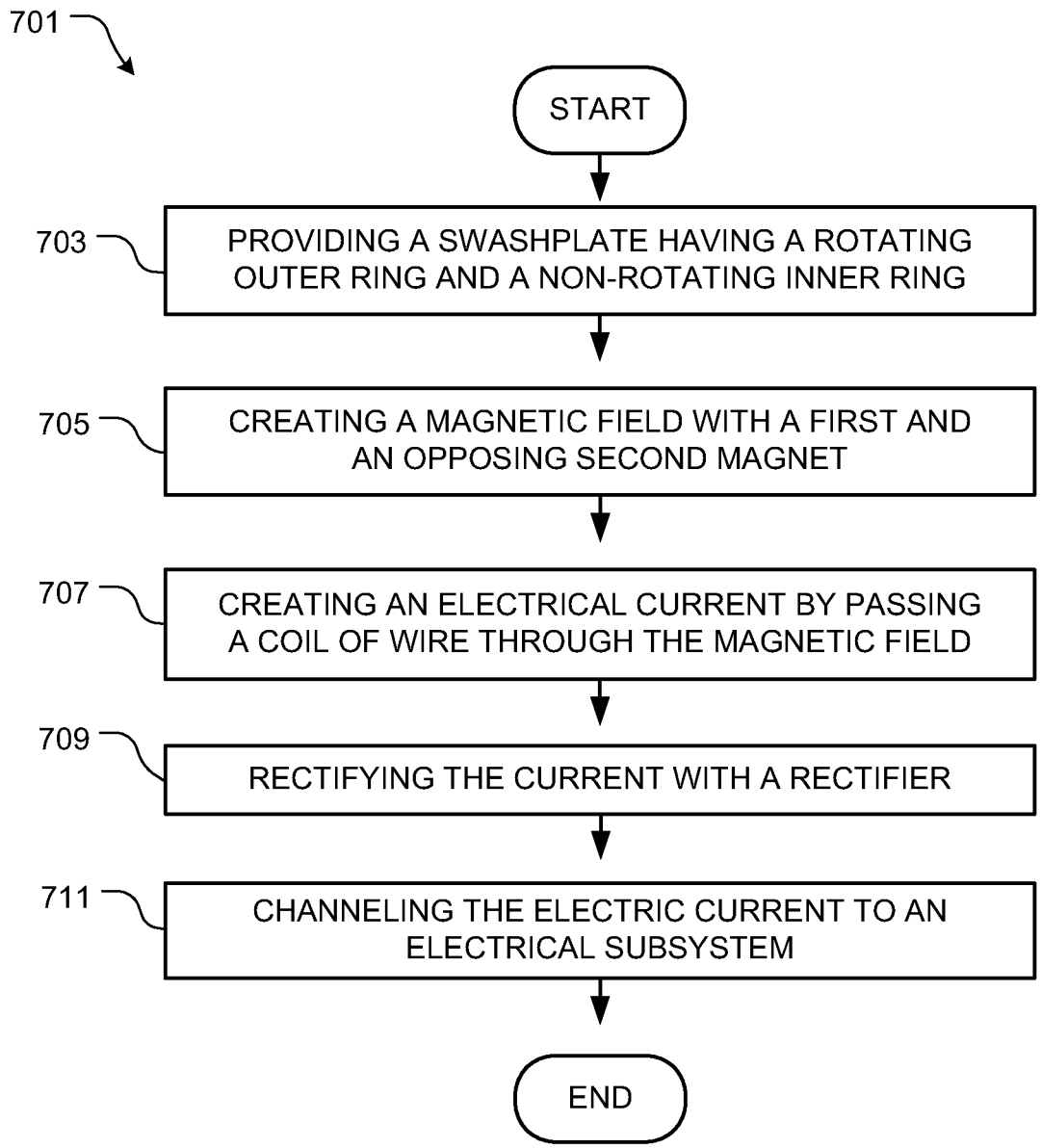
FIG. 7 is a flow chart illustrating the preferred method to create electrical energy with the swashplate system of FIG. 2.

Referring to. FIG. 7 in the drawings, a flow chart 701 illustrating the preferred method of the present application is shown. Box 703 depicts the first step, which includes providing a swashplate having a rotating outer ring and a non-rotating inner ring. Next, creating a magnetic field by providing a first magnet and an opposing second magnet, wherein the magnets are supported by the non-rotating inner ring, as depicted in box 705. Thereafter, an electrical current is created by passing a coil of wire through the magnetic field, wherein the coil of wire is supported by the outer ring, as depicted in box 707. The next step includes rectifying the electric current with a rectifier, as depicted in box 709. Finally, the last step includes channeling the electric current to an electrical subsystem via a conductor, i.e., a wire, as depicted in box 711.

It is apparent that a swashplate system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present embodiments are shown above, they are not limited to just these embodiments, but are amenable to various changes and modifications without departing from the spirit thereof.

The invention claimed is:

1. A swashplate system, comprising:
an outer rotating ring;
an inner non-rotating ring having a top surface; and
an alternator subsystem, having:
a first non-rotating magnet member having a first magnet, the first non-rotating magnet member being operably associated with the inner non-rotating ring;
a second non-rotating magnet member having a second magnet, the second non-rotating magnet member being operably associated with the inner non-rotating ring;
a winding member having a coil of wire, the winding member being operably associated with the outer rotating ring, the winding member being configured to pass between the first non-rotating member and the second non-rotating member; and
a bearing guide operably associated with the inner non-rotating ring;
wherein the first non-rotating magnet member and the second magnet member securely fasten to the bearing guide via an attachment means;
wherein the first magnet and the second magnet are selectively positioned to create a magnetic field therebetween; and
wherein, as the rotating ring rotates, the coil of wire passes through the magnetic field, which in turn creates an electrical current within the coil of wire.

2. The swashplate system of claim 1, further comprising:
a rectifier carried by the winding member;
wherein the rectifier is adapted to rectify the electrical current.

3. The swashplate system of claim 1, further comprising:
a metallic plate attached to a surface of the first non-rotating magnet member and disposed between the surface of the first non-rotating magnet member and a surface of the first magnet.

4. The swashplate system of claim 1, wherein the first non-rotating magnet member comprises:
a base having a surface;
wherein the surface of the base is oriented relatively parallel to the top surface of the surface of the inner non-rotating ring.

5. The swashplate system of claim 4, the first non-rotating magnet member further comprising:
an outer ring protruding from the surface of the base; and
an inner structure protruding from the surface of the base;
wherein the outer ring and the inner structure securely support the magnet in a relatively fixed position.

6. A swashplate system, comprising:
an outer rotating ring adapted to carry a coil of wire;
an inner non-rotating ring adapted to carry a first magnet;
a structure operably associated with the inner non-rotating ring and adapted to carry a second magnet; and
a bearing guide operably associated with the inner non-rotating ring;
wherein the first non-rotating magnet member and the second magnet member securely fasten to the bearing guide via an attachment means;
wherein the coil of wire is configured to pass between the inner non-rotating ring and the structure;
wherein the first magnet and the second magnet are selectively positioned to create a magnetic field therebetween; and
wherein the coil of wire passes through the magnetic field, which in turn creates an electrical current within the coil of wire.

7. The swashplate system of claim 6, further comprising:
a rectifier carried by the outer rotating ring;
wherein the rectifier is adapted to rectify the electrical current.

8. A method to create an electrical current with a swashplate system, the swashplate system having an outer rotating ring and an inner non-rotating ring, the method comprising:
creating a magnetic field with a first magnet and a second magnet operably associated with the non-rotating ring;
providing a coil of wire operably associated with the outer rotating ring;
securing the non-rotating ring and the rotating ring to a bearing guide;
rotating the rotating ring; and
creating the electrical current within a coil of wire by passing the coil of wire through the first magnet and the second magnet that create the magnetic field as the rotating ring rotates.

9. The method of claim 8, further comprising:
rectifying the electrical current with a rectifier.

10. The method of claim 8, further comprising:
channeling the electrical current to an electrical system conductively coupled to the coil of wire.

* * * * *

UNITED STATES PATENT AND TRADEMARK OFFICE
CERTIFICATE OF CORRECTION

| | | |
|---|---|---|
| PATENT NO. | : 9,024,505 B2 | |
| APPLICATION NO. | : 13/576575 | |
| DATED | : May 5, 2015 | |
| INVENTOR(S) | : Jordan Doyle et al. | |

It is certified that error appears in the above-identified patent and that said Letters Patent is hereby corrected as shown below:

On the title page item (75), line 3,
Replace the inventor's incorrect spelling of the first and last name -- Cristos, Bias -- with the correct spelling "Christos, Bais".

Signed and Sealed this
Ninth Day of February, 2016

Michelle K. Lee
*Director of the United States Patent and Trademark Office*